United States Patent [19]

Hasser et al.

[11] Patent Number: 5,736,978
[45] Date of Patent: Apr. 7, 1998

[54] TACTILE GRAPHICS DISPLAY

[75] Inventors: Christopher J. Hasser, Darien, Conn.; Marvin R. Roark, St. Paris, Ohio

[73] Assignee: The United States of America as represented by the Secretary of the Air Force, Washington, D.C.

[21] Appl. No.: 451,593

[22] Filed: May 26, 1995

[51] Int. Cl.[6] .................... G09G 5/00; G09B 21/00
[52] U.S. Cl. .................... 345/173; 345/156; 434/113; 434/114; 463/30
[58] Field of Search .................... 346/156, 157, 346/163, 173; 340/825.19; 434/112, 113, 114, 116; 463/30

[56] References Cited

U.S. PATENT DOCUMENTS

| | | | |
|---|---|---|---|
| 3,594,787 | 7/1971 | Ickes | 340/407 |
| 3,793,471 | 2/1974 | Mason et al. | 35/35 A |
| 3,932,869 | 1/1976 | Kane | 340/407 |
| 4,379,697 | 4/1983 | Linvill | 434/114 |
| 4,881,900 | 11/1989 | Matsuoka et al. | 434/113 |
| 4,905,001 | 2/1990 | Penner | 341/20 |
| 5,165,897 | 11/1992 | Johnson | 434/113 |
| 5,186,629 | 2/1993 | Rohen | 434/114 |
| 5,222,895 | 6/1993 | Fricke | 434/113 |
| 5,287,102 | 2/1994 | McKiel, Jr. | 340/825.19 |
| 5,293,464 | 3/1994 | Hirano et al. | 395/101 |
| 5,461,399 | 10/1995 | Cragun | 345/145 |

OTHER PUBLICATIONS

"A Virtual Braille Line for a Paperless Braille Device", by A. Parreno, Techniques and Devices for the Blind, Florence, Italy, Nov. 1988.

"The Graphical User Interface Crisis: Danger and Opportunity" by L. H. Boyd, W. L. Boyd and G. C. Vanderheiden, Technical report of the Trace R Center, University of Wisconsin–Madison, 1990.

"Pointing Keyboard and Tactile Feedback System for Blind Computer Users", by A. D. Johnson, Final Report for The Department of Education SBIR 93–025 [Contract Number RN93082004], TiNi Alloy Co., San Leandro CA, 1994.

"Electronic Components and Circuits, Reconfigurable Full–Page Braille Displays", D. Garner, NASA Tech Briefs, Langley Research Center, Hampton, Va, pp. 30, Jul. 1994.

Human Sensory Feedback for Telepresence Bibliographical Database Printout, Armstron Lab, Human Sensory Feedback Group WPAFB OH, 8 Feb. 1995, pp. 1–4.

*Primary Examiner*—Michael H. Lee
*Attorney, Agent, or Firm*—Gerald B. Hollins; Thomas L. Kundert

[57] ABSTRACT

A method for communicating graphic data such as plotted two–dimensional curves to a user such as a sight impaired person is disclosed. The disclosed arrangement uses haptic or tactile stimulation of a user's extremity such as is relied—upon in the Braille code fingertip communication already known to many sight impaired persons. Computerized control over a Braille character-like display and use of the computer mouse as a data selection input device; are included in the invention. The invention also includes provision of data enhancement and data interpretation aids including axis names, multiple curve identifications, grid line identifications and the addition of audio information such as tick sounds and spoken utterances to supplement the tactile communication. A computer-based embodiment of the invention is disclosed, this in the form of hardware block diagrams, software flow diagrams and computer code listing, the latter being primarily in microfiche appendix form.

20 Claims, 7 Drawing Sheets

(page 1)

(page 2)

(page 3)

(page 4)

(page 5)

(page 6)

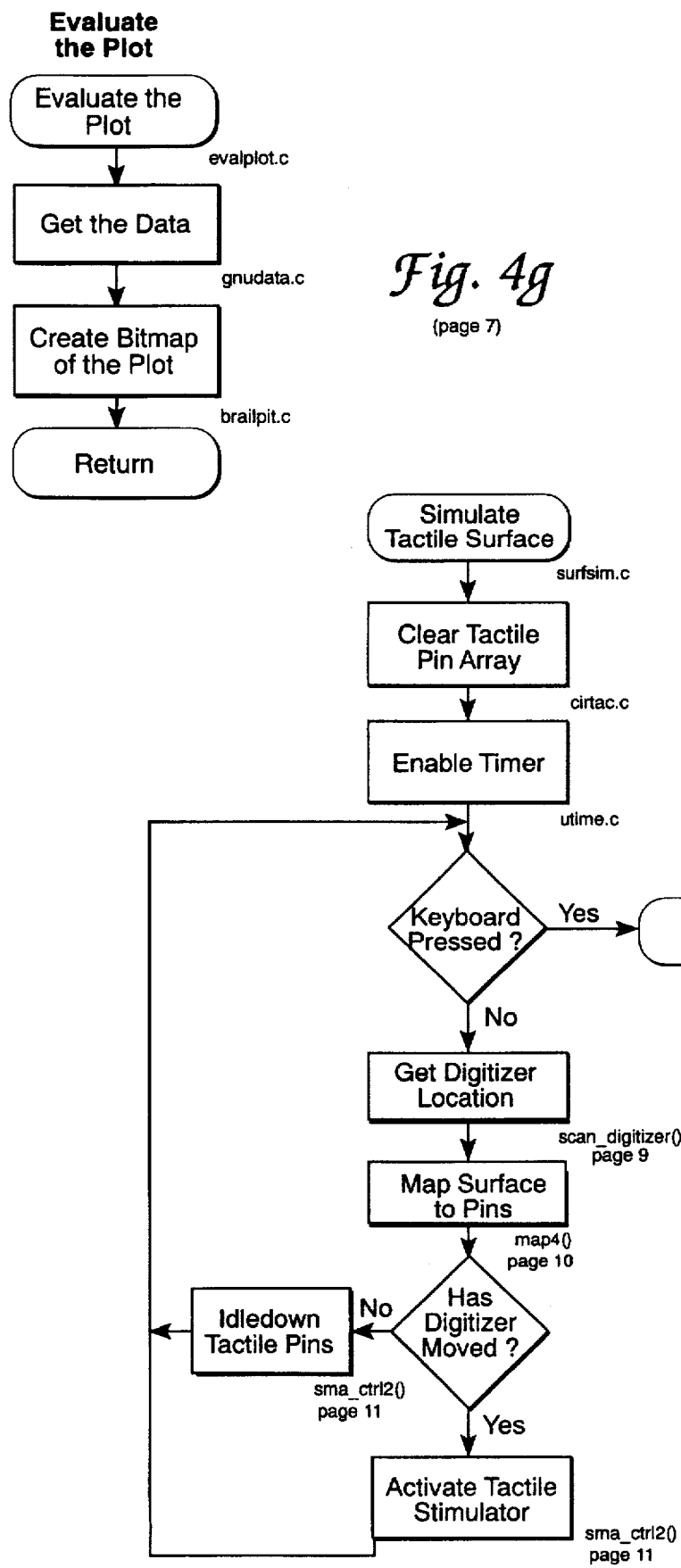
*Fig. 4g* (page 7)
*Fig. 4h* (page 8)

(page 9)

(page 10)

(page 11)

TACTILE GRAPHICS DISPLAY

RIGHTS OF THE GOVERNMENT

The invention described herein may be manufactured and used by or for the Government of the United States for all governmental purposes without the payment of any royalty.

MICROFICHE APPENDIX

This document includes a non-printed computer program listing which is disclosed in the form of a microfiche appendix as provided for in 37 CFR 1.96[b] and MPEP section 608.05. This appendix consists of a total of 5 microfiche. The microfiche appendix is supplemented by four pages of code listing included herein, code listing which defines the global variables used in the microfiche appendix code listing.

BACKGROUND OF THE INVENTION

This invention relates to the field of information communication to persons, such as those with sight impairment, by way of touch or tactile or haptic sensing through an extremity such as the finger. The invention is particularly concerned with the communication of a selected type of information, i.e. graphically represented data, to these persons.

Even though much research exists on the psychophysiology of human touch, the development of effective mechanical aids to enable greater use of this sense and provide new avenues of communication continues to be a challenge. Methods of representing graphical data to vision impaired persons have been notably absent in this field.

At the present time, for example, a person needing access to graphically represented data in a manner other than by eyesight is largely limited to the communication choices of printing the data plot using a specially disposed Braille printer, relying on Braille transferred summaries of the data, summaries such as mean values and standard deviation measurements, and relying on other persons to communicate the data. Since none of these choices is fully satisfactory there is a widely perceived need in the vision impaired person community for a reliable and cost effective tactile communication arrangement for graphic data. The method of the present invention is believed to provide one desirable answer for this need.

The US patent art indicates the presence of considerable inventive activity in the field of tactile communication, especially with respect to apparatus for performing specific parts of such communication such as the final act of machine-to-person information transmission. Prior patent activity appears however, not to have extended into the area non eyesight accomplished graphic or plotted data communication or into a full-screen Braille display that employs only a few pins on a virtual surface rather than an entire screen of pins.

Previous tactile communication-related patents include the patent of A. D. Johnson, U.S. Pat. No. 5,165,897, which is concerned with a tactile communication device engaging the user's finger with a multiplicity of stimulator pins to represent tactile sensations from a remote telerobot or a virtual environment. The Johnson apparatus employs electrical energization of shape-memory alloy metal wires in order to move fingertip-touching pin elements from their quiescent to their active positions in an ongoing serial communication arrangement through a computer output port. The patent discloses electrical circuitry and other details necessary for the operation of this communication arrangement. The Johnson patent is however largely silent with respect to the overall arrangement or the system aspects of tactile communication and does not address the more complex question of communicating graphic or two dimensional curve-embodied data, as is addressed in the present invention. The Johnson patent arises from work performed for the US Air Force laboratory of the present invention and discloses a final machine to human communication arrangement which may in fact be employed to useful advantage in embodying the present invention. The A. D. Johnson patent is therefore hereby incorporated by reference herein.

In addition the inventions of the H. Hirano U.S. Pat. No. 5,293,464, the J. Fricke U.S. Pat. No. 5,222,895, the H. C. Penner U.S. Pat. No. 4,905,001 and the J. G. Linvill U.S. Pat. No. 4,379,697 each disclose devices capable of performing this final machine to human communication function. In these patents the Hirano patent combines a Braille reading device with a computer, the Fricke device uses an "electrotheological" fluid, the Linvill device uses a piezoelectric polymer plastic material and the Penner device is primarily concerned with the inverse or human-to-machine communication function. The Penner patent also discloses machine-to-man communication using a vibrating element, however this element is positioned around the user's finger and is provided with simple vibration; both of these concepts contrast with applicant's present invention.

The invention of G. Kane in U.S. Pat. No. 3,932,869 is of general background interest with respect to the present invention in the sense that it discloses the use of electrical shock stimulation of a user's fingertips to convey the dot locations of Braille characters. Pulse modulation of these electrical shock signals is also disclosed in the Kane apparatus. Similarly the patent of G. Kane, U.S. Pat. No. 3,793,471, is of general background interest with respect to the present invention in that it discloses the use of a vibrating pin tactile stimulator in a phoneme or spoken sound-based communication system to a language handicapped person. The patent of M. Ickes, U.S. Pat. No. 3,594,787, is also of general background interest with respect to the present invention in that it discloses the use of a vibrating pin tactile stimulator in a scene-based tactile communication system. The cost and complexity of systems of the Ickes type are significant difficulties addressed in the present invention and by its use of a small "display device".

Several publications from the technical literature are also of interest as background information with respect to the present invention. These publications include the article "Development of Tactile Mice for Blind Access to Computers: Importance of Stimulation Locus, Object Size, and Vibrotactile Display Resolution" authored by S. F. Wiker, G. Vanderheiden, Lee S., and S. Arndt, which appears in Proceedings of the Human Factors Society 35$^{th}$ Annual Meeting, pages 708–712, 1991. In this publication two modes are used to gauge recognition capability of subjects for simple and complex shapes. One mode uses a dominant mode hand to explore the shape while tactile stimulation is presented to the non dominant hand. The other mode attaches the tactile stimulator to a mouse and presents stimulation to the dominant hand. Pixel-to-pin mapping, object size and orthogonality of line segments are found to have the largest effect in determining information transmission.

These publications also include the article "A Dual Information Class Model for Providing Access to Computers with Graphic User Interfaces for People who are Blind" authored by G. C. Vanderheiden, T. Anderson, L. H. Boyd and W. L. Boyd and published as a Technical report of the Trace R Center, University of Wisconsin-Madison, 1992. This report describes efforts to improve the access of blind persons to Graphical User Interfaces [GUI's; i.e. windows-like computer interfaces]. Early attempts involving overcoming obstacles to obtaining ASCII text information from a document or computer screen for standard voice tactile presentation are described. The most recent development uses a Telesensory System Optacon II tactile display [as is described below herein]. The Optacon II vibrators were placed on a planar absolute pointing device [similar to a graphics tablet puck]. Tactile enhancements included virtual buttons and tactile "ribs" on the virtual surface to enhance the user's sense of position. Other enhancements of the user interface included 3D audio and voice recognition.

These publications also include the article "The Graphical User Interface Crisis: Danger and Opportunity" authored by L. H. Boyd, W. L. Boyd and G. C. Vanderheiden and published as a Technical report of the Trace R Center, University of Wisconsin-Madison, 1990. In this publication there is described the use of a Telesensory Systems Optacon II tactile display to construct a moving haptic feedback device to represent graphical user interfaces [icons, menus, windows] on a computer screen. The Optacon II has a 5-column by 20-row vibrotactile array. In the first described system, the user moves the mouse to control the screen portion displayed on the Optacon II. One hand controls the mouse, and the other uses the tactile display. For absolute position reference and one-handed use, this system is improved. The Optacon II vibrators are placed on a planar absolute pointing device [similar to a graphics tablet puck]. Tactile enhancements include the appearance of virtual buttons and tactile "ribs" on the virtual surface to enhance the user's sense of position. Other enhancements of the user interface included 3D audio and voice. These authors are believed however, not to have addressed the graphing of data in plots or histograms as addressed herein.

These publications also include the document "A Bi-directional Vibrotactile Communication System", authored by Z. Kuc, a Ph.D. thesis, Stanford University, Stanford Calif., October 1989 in which Mr. Kuc also used an Optacon II connected to four position sensing microswitches to conduct experiments on human interaction with simulated tactile surfaces. Kuc studied more general aspects of vibrotactile displays in this role, including stimulator density, number of stimulators, data rates, and control of devices using virtual control panels.

Generally these previous devices do not appear to have the ability to vary stimulator pin vibration frequency and magnitude. All pins in these devices are on or off, vibrating at one preset frequency. The choice of earlier investigators to use piezoelectric phenomenon based stimulation also imposes serious frequency limitations.

These publications also include the article "A Virtual Braille Line for a Paperless Braille Device", authored by A. Parreno, and appearing in the publication "Techniques and Devices for the Blind", Florence, Italy, November 1988. In this publication the author appears to have constructed a six-pin tactile feedback cell using relays. He then presents Braille, one character at a time, to the user's fingertip. In a second generation device, he attaches the tactile stimulator cell to a rail with a position measurement sensor so that the tactile feedback cell can represent Braille characters anywhere on a virtual Braille line. Here the Parreno incremental photodetector arrangement ticks each time the feedback device moves over a new cell. Parreno appears not to mention two-dimensional position sensing; his disclosed apparatus is inherently incapable of two-dimensional sensing.

These publications also include the article "Pointing Keyboard and Tactile Feedback System for Blind Computer Users", authored by A. D. Johnson and published as a Final Report for The Department of Education SBIR 93-025 [Contract Number RN93082004], TiNi Alloy Co., San Leandro Calif., 1994. In the work disclosed in this final report for a six-month Small Business Innovation Research contract, Braille typists type on a six-key keyboard, simultaneously pressing the keys corresponding to the dots in a given Braille letter. Thus to type a single letter, one to six keys are depressed simultaneously. One innovation with this project is that the inventors locate tactile stimulators on the typing keys so that not only could the devices be used for Braille input, but for Braille output to the user as well. Since the users were familiar with the coded keys, they could decipher letters reasonably well. This is analogous to putting buzzers on the keys of a standard QWERTY keyboard. If the keys buzzed under the fingers of an experienced typist, he or she would be able to identify the letters that were being transmitted based upon a familiarity with the key locations [forgetting for the sake of example that with a QWERTY keyboard one would need 26 fingers to achieve this]. The inventors also place the six-finger display onto a two degree of freedom [x-y] position sensor so that the user could locate Braille letters anywhere on a virtual page. This invention uses the virtual page idea which Parreno did not, but it does not present all the stimulator pins to a single finger as Parreno and the present inventions do.

These publications also include the article "Graphic User Interfaces: A Tough Problem with a Net Gain for Users Who Are Blind" authored by G. C. Vanderheiden and published in Technology and Disability, 1[1], summer 1991. This article provides a very general overview in the field of tactile communication and makes only a brief specific reference to the tactile tablet system of the previously identified G. C. Vanderheiden et al 1992 paper "A Dual Information Class Model for Providing Access to Computers with Graphic User Interfaces for People who are Blind".

In the course of ongoing work with a shape-memory alloy [SMA] powered tactile feedback array, serious limitations have been noted. The most prominent of these is that the 5×6 pin array, for example simply rests motionless on the desk and does not allow the user to move his or her finger. Different patterns can be presented to the fingers of the user, but the user cannot move the finger around and receive stimulus defined by the motions of the finger. This is what one does with a finger when exploring his/her environment [i.e. performs haptic exploration]. This is a capability the present invention seeks to provide and to provide with accuracy. The prior art, including the patents and publications identified here, appears unable to provide this.

SUMMARY OF THE INVENTION

The present invention provides for the communication of graphic data such as two dimensional curves by tactile sensing. The invention allows prolonged study of the graphic data by the user and includes user aids such as grid lines, axis labels, and multiple curve distinctions. Audio-related user aids including spoken sound and signals such as tone or tick indications are additionally provided for. The invention also includes zoom-in, zoom out, and image detent or lock-on capability.

The invention represents a virtual surface by mechanically stimulating the fingertips of an observer. The apparatus used in the invention consists of a multi-element array of tactile feedback pins affixed to the "mouse" or pointer device of an absolute position sensing digitizer tablet. As the user moves the tactile array across the digitizer board, the array acts like a moving window of predetermined size and location, viewing a virtual surface described by a two-dimensional [for example] array in the software program. Each cell in this virtual array corresponds to a typically 3 mm by 3 mm square on the virtual surface [matching the 3 mm by 3 mm resolution of the tactile feedback device]. In the simplest situation, each cell represents either a raised feature on the virtual surface or remains a part of the featureless background. If a tactile feedback pin passes over a "raised" cell on the virtual surface it rises to stimulate the user's finger; otherwise it remains dormant. Pins can also be actuated with less upward movement to represent a textured surface with no raised edges.

In the herein disclosed preferred embodiment the tactile stimulator array is attached to the back of a mouse on a digitizer pad of the type used for computer-aided design [CAD] drawing packages so that the digitizer pad essentially serves as the virtual page. As the user glides the mouse/stimulator package along the surface of the digitizer pad, the surface features on the virtual page underneath the user's finger are represented on the tactile stimulator. Thus, while the digitizer pad is actually quite smooth, the user has the illusion of raised features appearing underneath his or her finger. These features will always appear to the user at the same location on the digitizer pad as when they were first felt, so the user can rely on his or her knowledge of the page to find previously explored features in the same position where they were last found.

It is an object of the present invention thereform, to provide a tactile graphic data or plotted curve data interface by tactile sensing.

It is another object of the invention to represent a virtual surface by mechanically stimulating the fingertips of an observer.

It is another object of the invention is to represent plots and other graphical data on a virtual surface by mechanically stimulating the fingertips of an observer.

It is another object of the invention to provide a tactile graphic data interface which affords many of the characteristics of a paper display or a computer screen display in tactile communication.

It is another object of the invention to provide a tactile graphic data display method which achieves a logically appealing and natural window lookthrough view of the presented data.

It is another object of the invention to provide a tactile graphic data display method which achieves a logically appealing and natural texture response to speed of scanning changes by the using person.

It is another object of the invention to provide a tactile graphic data display method which includes a plurality of user assistance aids such as are employed in conventional graphic data displays.

It is another object of the invention to provide a tactile graphic data interface which allows user manual-position-related selection of the reviewed data.

It is another object of the invention to provide a tactile graphic data display method which allows long term detailed examination and exploration of the presented data by the using person.

It is another object of the invention to provide a tactile graphic data display method which allows convenient modification and addition to the presented data by the using person.

It is another object of the invention to provide a tactile graphic data display method which relies on Braille code and other tactile communication protocols as are known and routinely employed by many potential users.

It is another object of the invention to provide a tactile graphic data display in which a tactile feedback pin passing over a part of a digitizer board coded with a "raised" feature on a virtual surface, is caused to stimulate the user's finger; otherwise it remains dormant.

It is another object of the invention to provide a tactile graphic data display method wherein pins can also be actuated with less upward movement to represent a textured surface with no raised edges.

It is another object of the invention to provide a tactile graphic data display method which uses both amplitude and frequency coding to improve the vibration enhancement of communication.

It is another object of the invention to provide a tactile graphic data display method which employs the known characteristics of a particular type of computer mouse device as an underlying part of its communication protocol.

It is another object of the invention to represent data with plots, histograms, and the like, on a virtual tactile surface.

It is another object of the invention to represent more than one set of tactile data by coding each data set with a different pin vibration frequency [in correspondence with the manner in which some color plotters use different colors to graph different lines].

It is another object of the invention to create a Braille title for a tactile data plot.

It is another object of the invention to present full-featured axes to the user, including axis tics that can be felt by the user's finger, Braille numerical labels for axis tics, and Braille labeling of axis names.

It is another object of the invention to generate a tactile grid of horizontal and vertical lines in the "background" to aid a user in tracking location and numerical values of plotted data.

It is another object of the invention to provide a tactile user assisting audio signal, with for example, a high-pitched tone when traversing grid line heading upwards or outwards, and a lower-pitched tone when traversing grid line heading back towards the origin of a data plot.

It is another object of the invention to provide voice labeling of title, axis labels, axis numerals, etc., so that a computer speaks words or numerals when a digitizer pad mouse passes over them.

It is another object of the invention to provide an ability to announce the name of whatever data line is underneath the computer's mouse, for example when a query button is pressed by the user.

It is another object of the invention to magnify plot features on a tactile surface, (zoom in), or to widen the field of view (zoom out).

It is another object of the invention to operate with alternate modes of user interface including a command-line mode and a Braille-menu on the virtual surface itself mode.

It is another object of the invention to provide a tactile graphic data display method that can be achieved with presently available materials and technology.

It is another object of the invention to provide an graphic data display method which provides concurrent images for sighted and tactile viewing.

It is another object of the invention to provide a tactile graphic data display method that may be achieved in a plurality of different physical size and physical apparatus arrangements.

It is another object of the invention to provide a tactile graphic data display method which uses readily available personal computer equipment in its achievement.

Additional objects and features of the invention will be understood from the following description and claims and the accompanying drawings.

These and other objects of the invention are achieved by an unconstrained in method of haptic data display for user realization of graphic data representations, said method comprising the steps of:

representing said graphic data as surface perturbations received on the surface of a computer memory data-defined virtual surface area, said surface perturbations comprising altered data states in said computer memory;

enabling prolonged, piecemeal and repeated haptic exploration of said virtual surface and said data surface perturbations by said user person, said prolonged, piecemeal and repeated haptic exploration including continuing readout accessing of portions of said computer memory in response to physical manipulation of a memory access control by said user person;

communicating results of said continuing readout accessing of said computer memory, including virtual surface data perturbation presence and absence-related memory data, to said user person as finger-received small area haptic data samples of said memory contents.

BRIEF DESCRIPTION OF THE DRAWINGS

FIG. 4g shows a more detailed flow diagram for a portion of the FIG. 4f software.

FIG. 4h shows a more detailed flow diagram for a portion of the FIG. 4d software.

DETAILED DESCRIPTION

The present invention allows users to feel an imaginary graphic tactile surface by placing their finger on a fingertip-sized array of electrically energizable blunt pins that are affixed to the back of a digitizer pad mouse. As the user moves the mouse and stimulator array, the computer tracks the location of the mouse and determines what pins of the stimulator should be raised, based upon the features of an imaginary surface, i.e. the graphic data being viewed, on the digitizer pad. The imaginary, or virtual surface, is actually a bit map stored in computer memory. The user essentially "looks" through the fingertip at the portion of the tactile image underneath the mouse. The device may be referred to as the TACtile GRAPHic [TACGRAPH] display.

Figure 1:
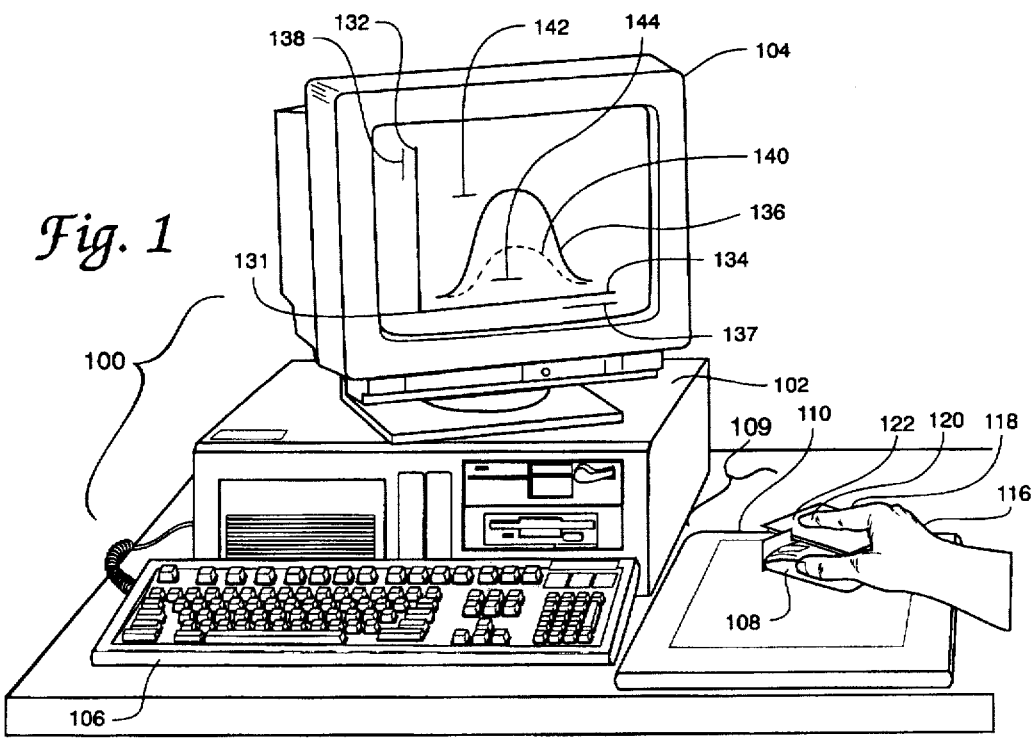
FIG. 1 shows an overall view of apparatus capable of achieving the method of the present invention.

FIG. 1 in the drawings therefore shows a preferred embodiment arrangement of the present invention. In the FIG. 1 drawing a computer 100 which may be of the IBM-compatible personal computer type [and is preferably of the 386/40 or later version] is shown to be used in conjunction with a keyboard 106, a cathode ray tube display 104, and a digitizer pad assembly 109 in presenting a visual image on a display screen 130. The digitizer pad assembly 109 of the FIG. 1 apparatus is altered from its normal appearance and function to include a tactile feedback array 122 which is mounted in conjunction with the normal digitizer pad puck 108 in order that a sight impaired user may receive information from the central processor 102 by way of a tactile or haptic communication protocol in accordance with the invention.

In the FIG. 1 drawing the user's hand appears at 116 and his/her finger is shown to be engaged at the fingertip 120 portion thereof with a tactile feedback array 122 of the type that is commonly used in dynamic or serial string communication of tactile coded information characters. A tactile feedback array 122 that is suitable for use in the present invention is for example shown in the above incorporated by reference U.S. Pat. No. 5,165,897 of A. D. Johnson. Devices of this type present a serial string of 6 to 9-dot-coded characters wherein each dot is communicated by an electrically energizable pin. Other devices of this nature are known in the art and may be used in embodying the invention. Tactile feedback arrays of the type represented at 122 have for example been used in six pin or eight pin configuration for the communication of normal and special Braille characters.

The FIG. 1 drawing also shows a representative or typical technical data plot on the display screen 130, the illustrated plot being in the form of the bell-shaped data curve 136 that is commonly used by statisticians and other persons needing to relate numeric quantities to naturally occurring phenomena. The curve 136 is presented on a coordinate axis set 131 of conventional nature which includes a vertical axis 132 and a horizontal axis 134. The coordinate axis set 131 is of course but typical of the arrangements which may be used to present technical data; other possible arrangements include circular or polar axis configurations, bar graph displays and dot density coded data.

By way of the present invention, displays of each of these types and additional types are presented in a tactile form. Such tactile display of graphic data has been notably absent from the data communication arrangements available in the past. Moreover in accordance with the present invention, these tactile displays are presented in a form that is usable for study or exploration by user persons for an extended period of time. The invention also provides a plurality of convenience or interpretation aids which assist in understanding the presented data in the shortest possible time. In the FIG. 1 drawing for example, the data curve 136 is provided with a data curve label 142 which may be disposed in tactile coded form. In a similar manner the data curve 136, the vertical axis label 138, the horizontal axis label 137, and a second data curve 140 may also be provided with coded identification labels which are accessed through the digitizer pad assembly 109; such a label for the data curve 140 is shown at 144 for example.

It should be noted that the visual display shown in FIG. 1, in addition to assisting in understanding the present disclosure, is also a convenience feature for users of the present invention since, even though a tactile display user may not have a need for this visual form of information, one or more colleagues of this user may rely on the visual data communication for discussion purposes. In the preferred arrangement of the invention wherein personal computer apparatus is used, it is of course easy to present the same computer generated image at a data port which connects to the cathode ray tube display 104 and at the computer's parallel data output port for example for connection with the tactile feedback array 122 of the digitizer pad puck 108 in the digitizer pad assembly 109.

The data curve 136 in the FIG. 1 drawing is of course presented in the manner considered normal to most persons, that is, in the form of a two-dimensional image on what is essentially a flat or planar surface. Such persons normally use two dimensional representations accomplished on a computer screen or on a flat piece of inscribable material such as paper or a chalkboard or the like. In the case of the present invention and the digitizer pad assembly 109 the image observed by the user is of course not actually represented on such a flat surface, but is instead considered to be resident on a virtual surface so that the user may be considered to look through the digitizer pad assembly 109 to view or examine in detail the perturbations located on this virtual surface. It is of course possible in either a normal or in the present invention display to include three-dimensional or multi-dimensional objects; the practice of representing an object in isometric perspective is for example valid in the present invention instance as well as in the sighted person display. More elaborate three-dimensional display protocols can of course also be used within the scope of the present invention.

The paradigm of the current invention can for example be extended to three dimensions by attaching the tactile feedback device to a six degrees of freedom position and orientation sensor such as a digitizer probe (e.g. the Immersion Probe, manufactured by Immersion Human Interface Corp. Santa Clara, Calif.) or to a force-reflecting device that can sense position and orientation and reflect forces to at least the three Cartesian degrees of freedom.

Figure 2:
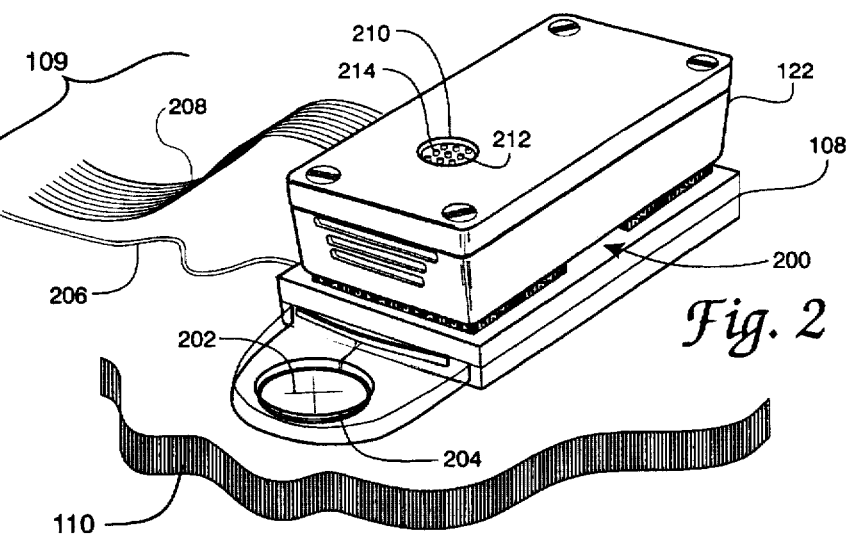
FIG. 2 shows a detailed view of a two-way tactile communication device which may be used in the FIG. 1 apparatus.

FIG. 2 in the drawings shows additional details of the digitizer pad assembly 109 in the FIG. 1 drawing. In the preferred arrangement of the invention the digitizer pad assembly is embodied as a combination of a digitizer pad element 110 with a tactile feedback array 122 element. According to this arrangement, the user of the invention is provided with a sense of location and perspective concerning the relatively small sized data sample provided by the 9 dot, one character sized window of the tactile feedback array 122 by way of his inherent sense of hand and finger positioning. The operation of this sense of location and perspective may be appreciated by realizing that it is relatively easy for humans to distinguish differences in hand or finger position that mount to fractions of an inch and that this ability extends to positions in two dimensions with respect to a reference point or an origin of a coordinate axis set. This distinction is used in the present invention as the observed data sample access control or in other words as the window location determination. In essence thereform the user determines what portion of the data curve he/she is to view by positioning the digitizer pad assembly 109 at an appropriate position on the digitizer pad 110.

In the present invention it is thereform preferred that the tactile feedback array 122 be physically attached to the digitizer pad puck 108 so that these two computer ports, i.e. the computer's input and output data ports, move in unity and provide the desired "look through a portable window" view of the accessed data curve. Any of many possible attachments may be used to achieve this physical unity arrangement; an assembly wherein the tactile feedback array 122 is attached to the digitizer pad assembly 109 by way of a removable Velcro® attachment has been found to be convenient. Alternately it is possible to fabricate these two devices in a unitary package that is especially configured for this purpose, as would be desirable in manufactured embodiments of the invention.

The digitizer pad puck 108 portion of the digitizer pad assembly 109 is of course similar to but quite distinguishable from the conventional computer mouse pointer which has become well known in the art. Although the conventional mouse pointer or "mouse" provides for human input of position data to a computer, a difference between this device and the digitizer pad puck 108 of the digitizer pad assembly 109 lies in the fact that the digitizer pad puck 108 provides absolute rather than relative position input to the computer. According to this capability for example, each disposition of the digitizer pad puck 108 at a position one inch displaced from the top and left side margins of the digitizer pad 110 always provides the same position data to the computer. Devices of this type may be generally identified by the term "planar absolute position sensors."

In the preferred embodiment of the digitizer pad puck 108, (as is obtained from the CalComp Digitizer Products Group of Scottsdale, Ariz.) this absolute position determination is achieved through the use of a magnetic pickup coil and an array of magnetic transmitter coils located within the digitizer pad 110; other arrangements of such apparatus are known in the art and may be used. Devices in the nature of the digitizer pad puck 108 are often referred to in the computer art as a "data tablet mouse" or a "digitizer tablet mouse" and thereform the terms "mouse" and "puck" are used interchangeably herein. The "mouse" referred to in the present invention is to be distinguished from the more conventional relative position computer "mouse" however. The arrangement of the digitizer pad puck 108 shown in FIG. 2 is achieved by disassembly of and reconfiguration of the CalComp puck into the illustrated cross-hairs within the pickup coil configuration shown in the drawings.

In the FIG. 2 drawing is shown a perspective close-up view of a second digitizer pad assembly 109 in which several of the component parts may be observed. The FIG. 2 arrangement of the digitizer pad assembly 109 is in some ways to be preferred over the different FIG. 1 depicted digitizer pad assembly 109 where the tactile feedback array 122 is located in piggy-back fashion on the CalComp digitizer pad puck 108. In FIG. 2 for example the TiNi Company-provided tactile feedback array 122 is shown to be mounted, by way of mating Velcro® strips located in the region 200, on the top of a different and specially configured digitizer pad puck. This arrangement of the digitizer pad puck is found convenient because of its lower physical profile in comparison with the CalComp mouse device and in order to provide more precise positioning information regarding the digitizer pad assembly 109 to sighted user persons. The cross-hair apparatus at 202, which is part of a clear plastic sheet sandwich surrounding the pickup coil 204, assists in this laboratory assessment of digitizer pad assembly 109 positioning to sighted persons. The pickup coil 204 has been removed from the CalComp-supplied mouse assembly in order to achieve the more convenient and practical digitizer pad assembly 109 shown in FIG. 2. For laboratory use this removal may consist of physically extracting only the pickup coil 204 from the CalComp device and providing the two wire connecting tether indicated at 206 to the CalComp device located in an unused area of the FIG. 1 scene. A more refined and non-laboratory embodiment of the invention may employ an integral configuration of the assembly 109.

By way of explanation, it is not a necessary part of the invention that the assembly 109 be an integral unit. The FIG. 2 illustrated relative positioning of the tactile feedback array 122 and the digitizer pad puck 108 is however believed desirable in most uses of the invention since the digitizer pad puck and tactile feedback array 122 being in integral form provides location-related information to the user at the point of application of the tactile stimulus as is explained in more detail elsewhere herein.

Moreover, according to the preferred arrangement, the integral digitizer pad puck 108 and tactile feedback array 122 are also of similar footprint configuration and are also parallel-disposed to occupy minimum digitizer pad 110 space during use. The software code disclosed in the microfiche appendix hereto assumes however that the tactile feedback array 122 is rotated from this parallel disposition of the digitizer pad puck 108 and the tactile feedback array 122, i.e. assumes rotation ninety degrees counter-clockwise in the plane of the FIG. 2 drawing from the relationship shown in FIG. 2. [This rotated arrangement is a result of a misunderstanding in verbal communication in an early phase of work relating to the invention.] A simple mapping change in the software of the microfiche appendix will of course correct this difference dud permit the FIG. 2 configuration of the digitizer pad assembly 109 if use of the rotated tactile feedback array 122 and digitizer pad puck is not convenient.

Returning then to the FIG. 2 description, the digitizer pad assembly 109 also includes a ribbon cable tether connection 208 to the computer parallel port-connected interface electronics and a two wire tether 206 connection to the CalComp mouse assembly and the computer's serial port. Tether-free arrangements of these connections (i.e. using radio frequency and the like communication) could of course be arranged for large data curve examination and similar unrestricted uses if desired.

Within the window aperture 210 of the tactile feedback array 122 are located individual pins 212 and 214 of the tactile feedback array 122; these typical pins are two of the full complement pins and are preferably energized by the TiNi company apparatus described in the U.S. Pat. No. 5,165,897 of Johnson referred to above. Use of this relatively small nine pin array for graphic data examination as is enabled by the present invention is a significant economic advantage over the larger pin arrays identified in the above recited prior art devices. The top surface of the tactile feedback array 122 surrounding the array of pins may be covered by finger guide member which includes an open-top elongated slot finger reception area that terminates in the space surrounding the window aperture 210 if desired. This finger guide member is not shown in FIG. 2 but may be fabricated of an additional layer of plastic material which overlays the tactile feedback array 122 and has a open slot end facing the user and a closed slot end disposed surrounding the window aperture 210.

Figure 3:
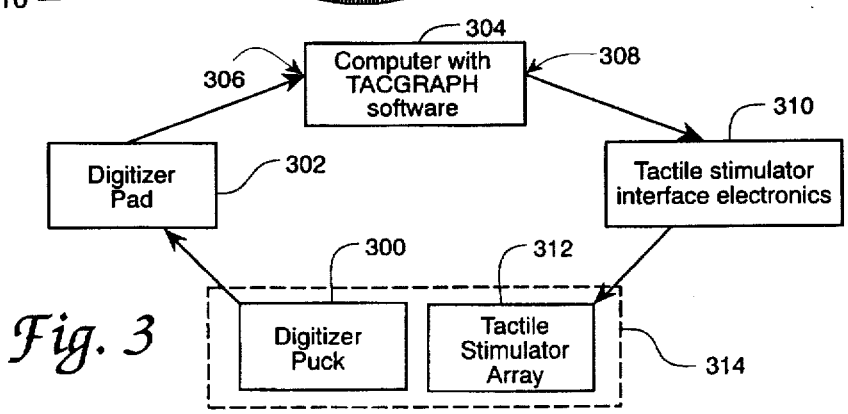
FIG. 3 shows an hardware block diagram for computer apparatus which may be used to embody the present invention.
Figure 4A:
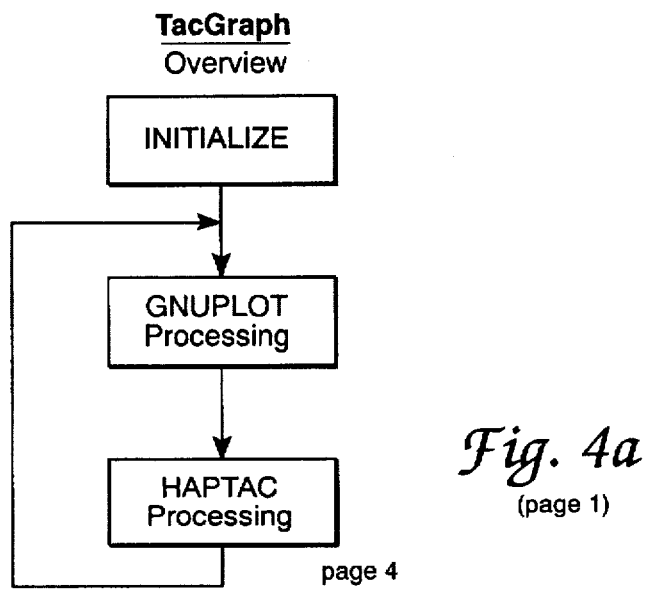
FIG. 4a shows an overall flow diagram of computer software which may be used to embody the present invention.
Figure 4B:
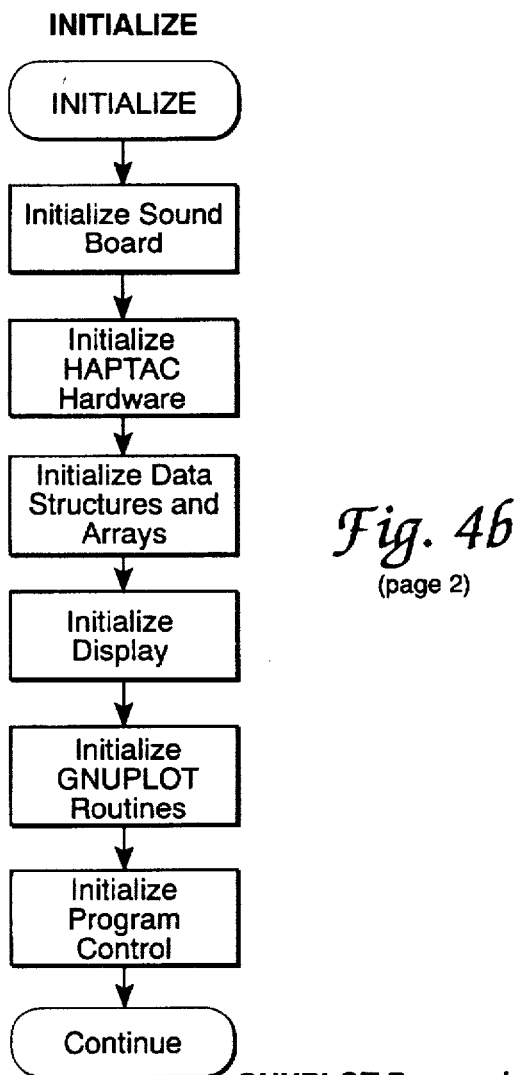
FIG. 4b shows a more detailed flow diagram for a portion of the FIG. 4a software.
Figure 4C:
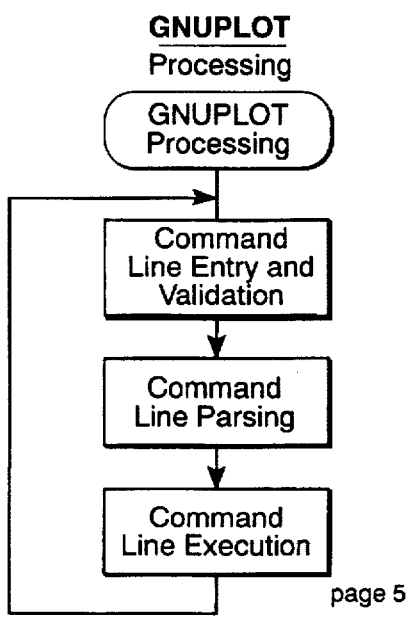
FIG. 4c shows a continuation of the FIG. 4b flow diagram.
Figure 4D:
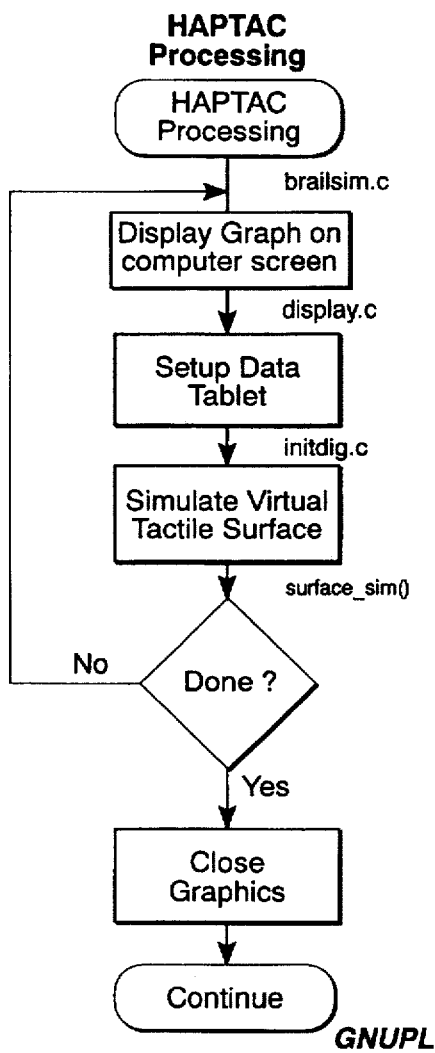
FIG. 4d shows a more detailed flow diagram for a portion of the FIG. 4a software.
Figure 4E:
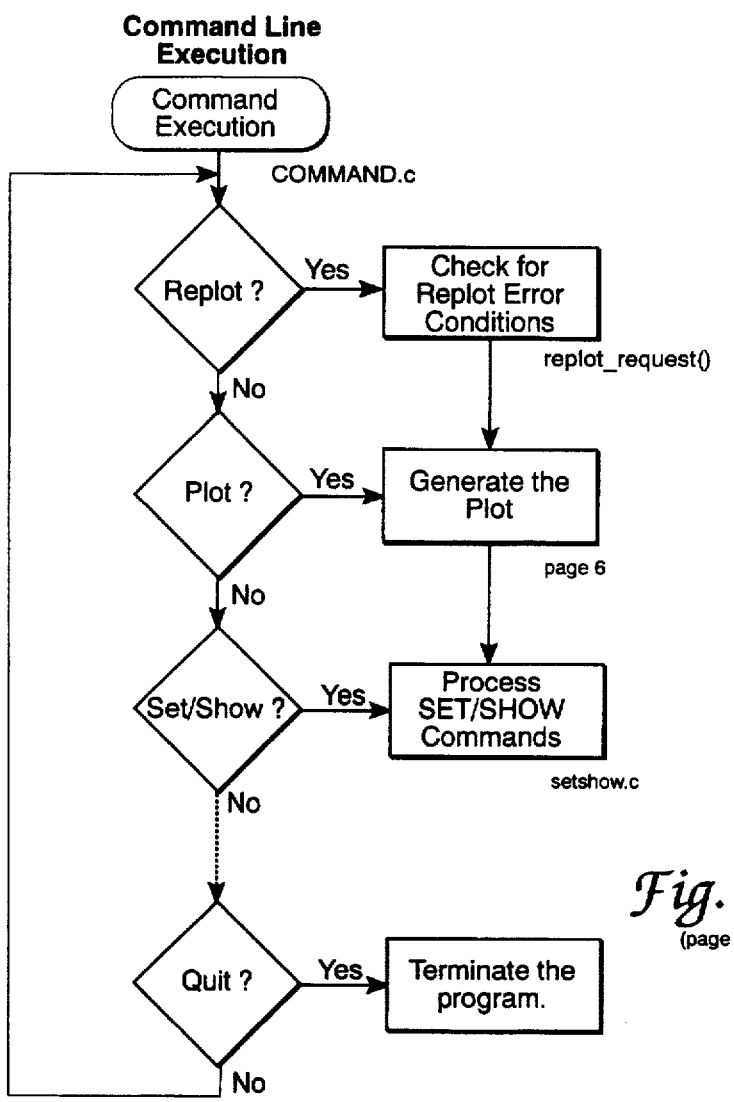
FIG. 4e shows a more detailed flow diagram for a portion of the FIG. 4c software.
Figure 4F:
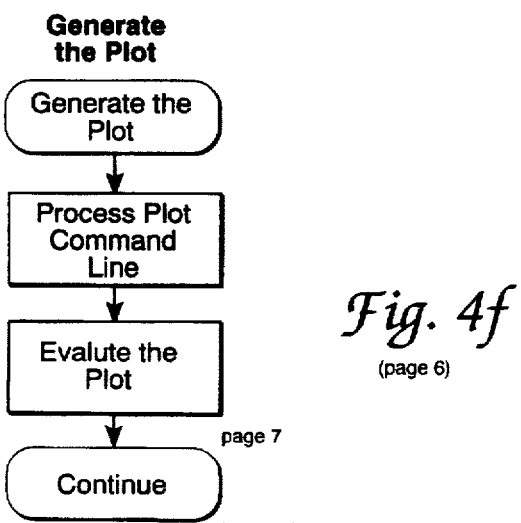
FIG. 4f shows a more detailed flow diagram for a portion of the FIG. 4e software.
Figure 4I:
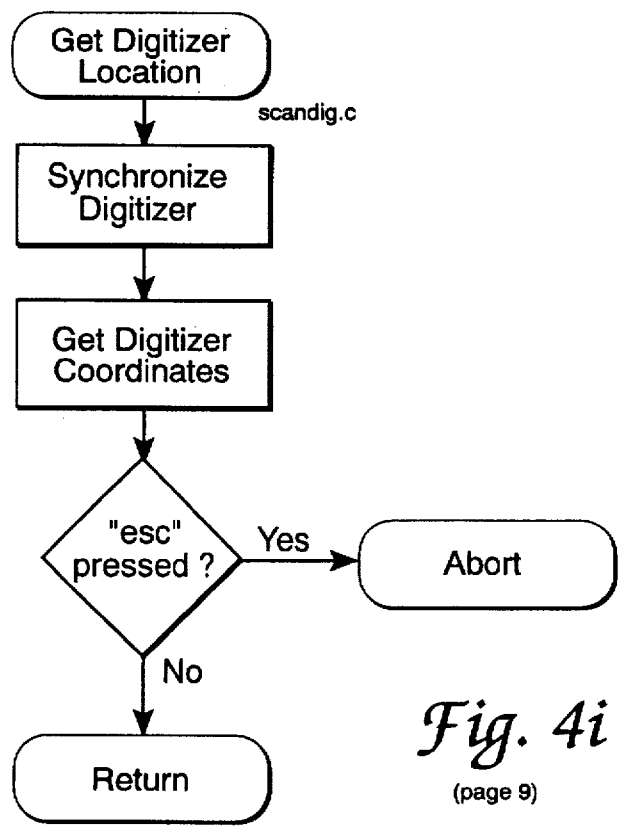
FIG. 4i shows a more detailed flow diagram for a portion of the FIG. 4h software.
Figure 4J:
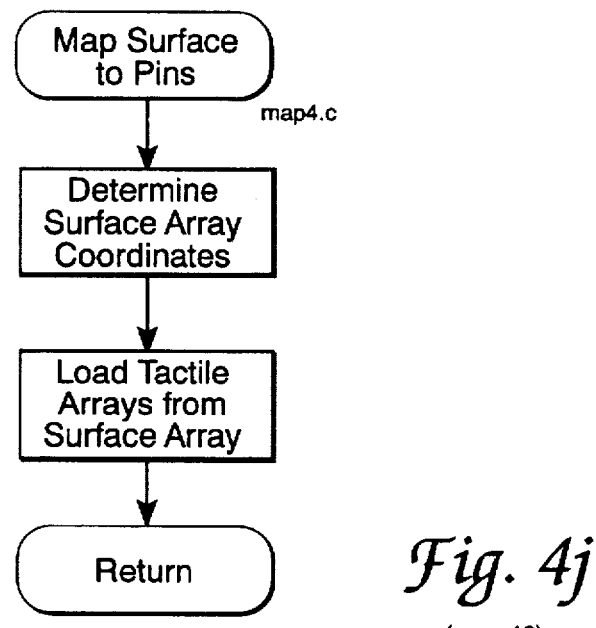
FIG. 4j shows a more detailed flow diagram for a portion of the FIG. 4h software.
Figure 4K:
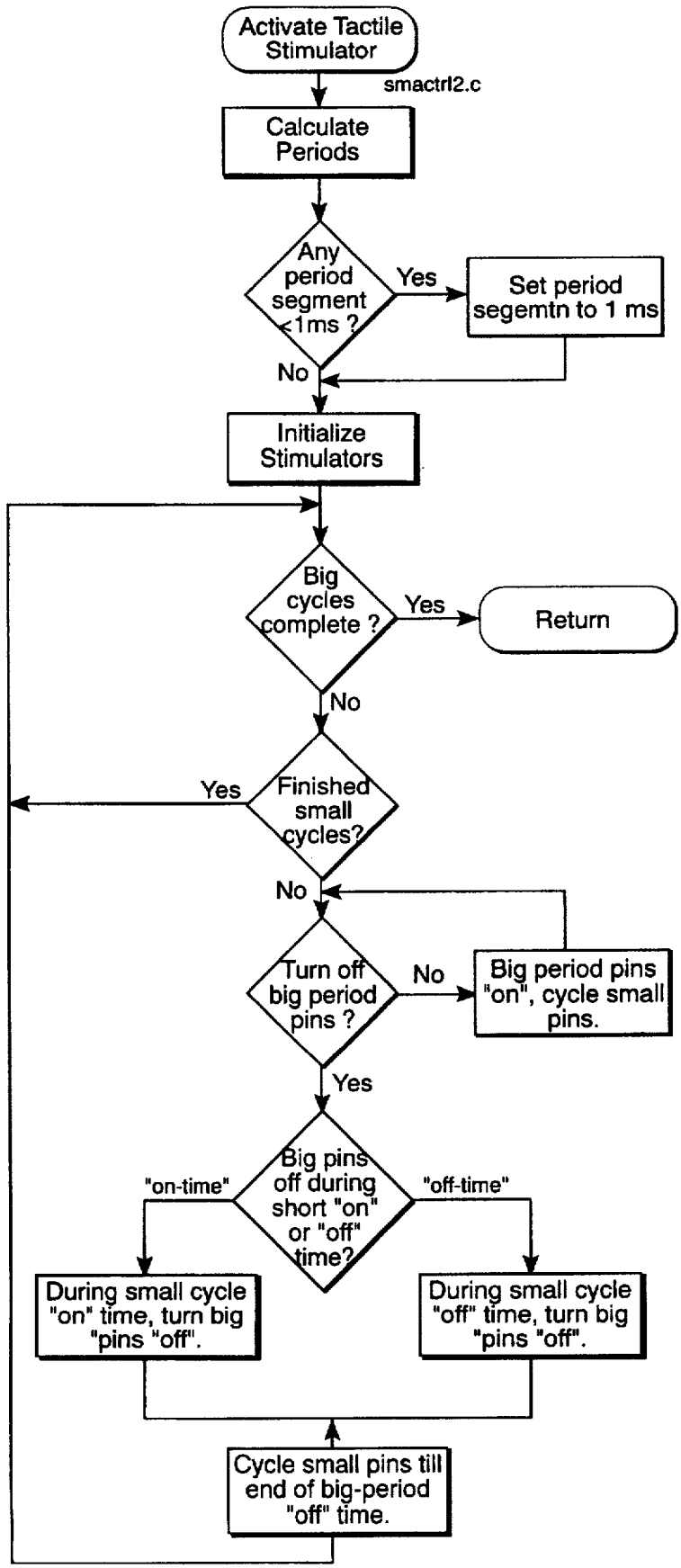
FIG. 4k shows a more detailed flow diagram for a portion of the FIG. 4h software.

FIG. 3 in the drawings shows a block diagram of the hardware used in the FIG. 1 embodiment of the invention. In this drawing the digitizer pad puck 108 is represented at 300, the digitizer pad 110 at 302, and the computer 100, together with the software (which is disclosed subsequently herein) in residence, at 304. The bi-directional serial and parallel ports of the computer are indicated at 306 and 308 in FIG. 3. The FIG. 1 tactile feedback array 122 is shown in block diagram form at 312 in the FIG. 3 drawing and the preferred but not required physical connection of these devices is indicated at 314. The block 310 in FIG. 3 represents an array of interfacing electronic circuits. The software controlled serial bits for energizing individual pin elements [of the digitizer pad puck 108) of the tactile feedback array 122 and 300] are placed in suitable form for energizing the pin-controlling transducers in the tactile feedback array 122 and 300 by this circuit array. As may be discerned from examination of the software routines "Smactrl 2.c" and "Setpat 3.c" which are concerned with this energizing, an arrangement of pulse width modulation is employed in the present invention order to provide desirable vibrational stimulus movement and duty cycle control of energy levels for the pins of the tactile feedback array 122 and 300—and in order to control the force with which the array of pins engage the user's fingertip 120.

The electrical circuitry of the block 310 consists essentially of a serial to parallel data conversion shift register and a switching or saturating type of discrete transistor amplifier circuit connected between each of the shift register parallel output terminals and the corresponding input terminal of the tactile feedback array 122 and 300. Circuits of this type are well known in the electronic art and are not therefrom additionally disclosed herein. A circuit of the type shown in FIG. 5 of the above incorporated by reference patent 5,165, 897 of A. D. Johnson also is suitable for this purpose, especially in view of the indicated preference for the Johnson transducers in the digitizer pad assembly 109.

Parenthetically it is noted that even though 100-series numbers are used to indicate drawing location of reference numbers herein, reference to the same element of the invention by two different drawing numbers [as in the example of the digitizer pad puck 108 by using both of the reference numbers 108 and 300—since this element appears in two different forms, e.g. in physical and block diagram forms] is avoided in preference for use of the original FIG. 1 or other first introduced identification in the later portions of this document.

COMPUTER SOFTWARE

While the herein described preferred embodiment of the invention is implemented using computer software, it is to be understood that this has been accomplished largely as a matter of laboratory convenience and cost—especially in view of the ready availability of personal computer equipment in present day technical facilities. Hardware in the form of computer logic gates, flip-flop memory circuits, electronic timing circuits, and other apparatus can readily be substituted for the functions accomplished in the herein disclosed software. Such an embodiment of the invention could of course be very large and complex in form if disclosed as electronic circuits or as relay logic [which appears a technical feasibility in view of the relatively slow tactile character pin use of the output signals of the system]. Such hardware embodiments are nevertheless technically possible and indeed are submitted to be "disclosed" within the meaning of US patent law by the enclosed software listing. (Persons skilled in the related arts or indeed machine-based apparatus are capable of software code to logic equation conversion.)

FIG. 4 in the drawings includes the views of FIGS. 4a through 4k. These drawings show a series of flow diagrams for the computer software used in the preferred embodiment of the invention, the software disclosed in the above referred-to microfiche appendix. The information disclosed in these drawings appears in the form of conventional block symbols [wherein program flow decisions are represented by diamond shaped boxes and so on] with text inclusions appearing in each block. Text recitations also appear at the start and completion of several block strings and text recitations appear just below certain of the blocks. The text inclusions within the FIG. 4 blocks of course identify the name of or the function of the software represented by that block using names which appear in the microfiche appendix code listing, names which also appear in certain of the other flow diagram drawing FIGS. The name appearing outside of a block at the start of several of the block strings in FIG. 4 is of course the name given to the software of that string while the name and page number reference at the end of certain block strings refers to another software string appearing on another page, i.e. in another drawing figure in the FIG. 4 group. (The FIG. 4 drawings thereform bear both a page number and a FIG. number identification; the page number identifications actually originate in pre patent application documents.)

In addition to the FIG. 4 flow diagram disclosure of the software employed in the preferred embodiment of the invention, applicants have, as noted at several points in this text, also provided disclosure in the form of a computer code listing which appears in the microfiche appendix. Four additional pages of this same software are also attached to this specification. These four pages provide definitions of the global variables used in the microfiche appendix pages of code listing. The code of this appendix listing is in accordance with the "C" programming language and was compiled with a compiler routine for the "Turbo C" version of the "C" language obtained from Boreland International Corporation of Scotts Valley, Calif.

The appendix computer code listing includes an adaptation of a software routine known in the computer software art as "GNUPLOT". The "GNUPLOT" routine is available on the "Internet" and bears the following copyright and user notice-a notice which also appears in the microfiche appendix.

"Copyright [C] 1986–1993 Thomas Williams, Colin Kelley

Permission to use, copy, and distribute this software and its documentation for any purpose with or without fee is hereby granted, provided that the above copyright notice and this permission notice appear in supporting documentation.

Permission to modify the software is granted, but not the right to distribute the modified code. Modifications are to be distributed as patches to released version."

Adaptations of the "GNUPLOT" software for use in the present invention are accomplished in the form of certain additions as in the instance of routines bearing the filenames "Boxes.c", "Ctrlpanl..c", and "Dispgraf.c" for examples; by way of "commenting out" selected unneeded portions of the code; and by actual additions and changes to certain other portions of the code. Notable instances of this latter type of adaptation appear in the routine bearing the filename "Brailgr.c" for example. Generally speaking the most salient software adaptations of the present invention comprise arranging the printer-intended output of the "GNUPLOT" routine to accommodate the needs of the FIG. 1 embodiment and especially to accommodate the needs of the digitizer pad assembly 109. Notably in this regard the digitizer pad assembly 109 uses four of the available twenty five parallel port output pins in the direct control of energization for pins in the tactile feedback array 122. One of these four port pins, is used for serialized array-pin output data, the other port pins for control purposes—as will be apparent from the "Setpat 3.c" software file. The strobe synchronization uses one of the parallel pins that is set aside for control purposes. The data bits for the serial-to-parallel register are loaded sequentially and then strobed all at once into the pin electronics power transistors.

The appendix-disclosed software code listing is also provided with a number of programmer notes or comments which are intended to assist in providing a detailed and timely understanding of the invention. These notes in combination with the present discussion and a working knowledge of (or assistance from persons having a working knowledge of) the "C" programming language are submitted to meet the needs of a person of ordinary skill in the programming or other related art.

Several capabilities of the invention and related parts of the computer software appear deserving of special comment in the present discussion. One such capability is concerned with missing dots and the fact that the well-known Braille code for alphabetic and numeric characters is based on the presence and also on the absence of dots or elements in a six to nine dot field. More precisely, since the present invention provides opportunity for a user to examine graphic data curves in a relatively small sample and since this examination is of a free-form or unstructured nature, [it can occur in any pattern of approach selected by the user rather than being limited to a particular starting point or examination sequence] there comes a question as to how a user's encounter with an isolated dot, such as an incomplete portion of a character or a data curve, is to be interpreted. Clearly in the case of characters or numbers, it is unsafe to accept a character identification when less than a full dot field is encountered.

On the other hand the unstructured and long time of examination concepts suggest that a user may well not know where to look for missing dots or may have forgotten or become disoriented during a long examination and is thus unable to readily find the remainder of the character's dots or to ascertain the true pattern of the data under examination. In the present invention this possibility is addressed with a software embodied arrangement for locating the remaining dots of a partially encountered field. This capability resides in the software file identified as "Map 4.c" in the microfiche appendix. Generally this software routine functions to scan the dots surrounding an encountered dot and attempts to center the viewing window on the center of a dot field. The data coding used in this routine employs the numbers 8, 4, and 5 for purposes similar to the 0, 1, and 2 coding described in connection with the vibrating pins below.

In addition, upon reflection it may become apparent to one skilled in the tactile communication art that when a user's finger scans across a textured surface, minute features on that surface cause vibrations in the skin that are picked up by the nerve endings or mechanoreceptors of the finger. The faster the finger moves across the surface, the faster these vibrations occur, i.e. the greater their frequency. The present invention thereform is capable of providing for variation of the frequency of finger stimulation to correspond to the speed of finger movement in order to produce a more realistic perception of a surface with constant texture, no matter what the finger speed. This concept can be added to the software of the microfiche appendix by modifying the routine "Scandig.c" to determine mouse velocity and modifying the routine "Smactrl 2.c" so that pin vibration frequency is dependent on the determined velocity.

In addition, according to a different aspect of the invention it is known that different mechanoreceptors [nerves] in the human finger respond to different frequencies and magnitudes of vibration, with differing levels of spatial resolution. One type of mechanoreceptor for example responds to contact as the finger encounters the edge of a raised surface, and another set of mechanoreceptors is believed to respond to the texture of that surface. Using the same stimulation to simulate both sensations is not therefrom the most effective communication technique, but has been the arrangement of choice in the prior art.

The present invention however improves upon this arrangement by providing the capability for selectively stimulating these mechanoreceptors. Pins positioned over the center of a virtual shape may vibrate with low magnitude and high frequency to simulate texture, while pins located over the edges of a virtual shape may vibrate at lower frequency and higher magnitude to simulate edges. This concept which is believed to be novel in the present invention resides in the software files identified as "Map 4.c" and "Smactrl 2.c" in the microfiche appendix.

Two data storage arrangements are feasible for use in connection with files having such multiple vibration frequency. One of these employs conventional 1's and 0's file storage and the other employs a bit map organized storage. In the latter arrangement for example a stored 0 could be used to represent no pin vibration, a stored 1 to represent pin vibration at one frequency and a stored 2 vibration at another frequency and so on.

Yet another pin vibration related aspect of the present invention is based on an accommodation of the fact that when human nerves receive the same stimulus for a period of time, they begin to adapt, and the magnitude of the perceived stimulus lessens [this is why a person does not notice the eye-glasses sitting on the bridge of his or her nose, for example]. An ability to reduce the magnitude with which the invention stimulates the user in response to its time of presence is therefrom provided herein and allows for limitation of nerve adaptation. This concept which is believed to be novel in the present invention resides in the software file identified as "Swfsin.c" in the microfiche appendix. This feature can be activated by setting the Boolean variable "idledown" to a high state.

Another aspect of the present apparatus is concerned with the fact that with the preferred free and unrestricted movement positioning of the digitizer pad assembly 109 and the unrestricted nature of the displayed data curve shape, there will be a large number of angular relationships between the slope of the encountered data curve and the slope of the available individual pin pattern in the Braille matrix display. Clearly for example when a vertically disposed data curve is intersected by a user's scanning movement at an angle of ninety degrees, the resulting display on the Braille matrix should be along a top to bottom oriented vertical line of the Braille matrix. In the case of intermediate data slope dispositions some compromise is however clearly needed. This compromise is accomplished in the GNUPLOT routines in the appendix software and generally involves a closest approximation given the resolution of the plot under consideration.

The herein disclosed system therefrom consists of a multi-element array of tactile feedback pins affixed to the "mouse" or pointer device of an absolute position sensing digitizer tablet apparatus of the host computer. As the user moves the tactile array across the digitizer board, the array acts as for example a 5 by 6 or 3 by 3 pixel moving window on a virtual surface described by a two-dimensional array in the software program. Each cell in the virtual array may correspond to a 2.5 mm by 2.5 mm resolution of the tactile feedback device for example. Magnification as provided in the above described parts of the software can of course alter this one to one correspondence. Both the number of pins used and the pin spacing and other dimensions disclosed herein are of course exemplary in nature and not intended as limitations of the invention. In the preferred implementation, therefrom, each cell represents either a raised feature on the virtual surface or remains a part of a featureless background. If a tactile feedback pin passes over a "raised" cell on the virtual surface it rises to stimulate the user's finger; otherwise it remains dormant. Pins can also be actuated with less upward movement to represent a textured surface with no raised edges.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. A computer lookthrough and virtual surface inclusive tactile method for communicating multi-dimensional graphic data to a sight impaired and hearing impaired human operator, said method comprising the steps of:

combining a computer data input function of a planar absolute position sensor assembly physically with a computer data output function of an operator finger-engageable, electrically energizable, unitary character, multiple pinned tactile display array to form a portable, bi-directional communication, data transducer device having operator-provided mobility over an absolute position-determining-digitizer pad surface;

storing a bit map representation of said multi-dimensional graphic data in a computer memory having a memory location relating to each pixel point of said absolute position-determining digitizer pad surface according to a selected virtual surface-defining relationship;

accessing said computer bit map data representation in said computer memory data in response to operator induced absolute position changes of said portable, bi-directional communication, data transducer device across said absolute position-determining digitizer pad surface and said virtual surface; and energizing accessed memory data-determined pixel elements of said multiple pinned tactile character display array, in graphic data-detailed tactile communication with said human operator, and in synchronism with movement and absolute positioning of said portable, bi-directional communication, data transducer device to absolute position-determining digitizer pad surface and virtual surface locations of graphic data presence in said memory.

2. The method of claim 1 wherein:

said multiple pinned tactile display array energized pixel elements have a predetermined pattern relationship with portable, bi-directional communication, data transducer device accessing-determined features of said memory stored multi-dimensional graphic data; and said predetermined pattern relationship includes a pattern of top to bottom aligned tactile pin display array element energization in response to a ninety degree intersection of said portable, bi-directional communication, data transducer device scanning movement with said graphic data.

3. The method of claim 1 wherein said energizing step includes changing operator perceived axial movement amplitude of pixel-related matrix array elements in said operator finger-engageable, electrically energizable, unitary character, multiple pinned tactile display array in response to accessed memory data and a pin control algorithm.

4. The method of claim 3 wherein said energizing step includes vibrating said pixel related matrix arrayed elements along at least one axis thereof.

5. The method of claim 1 further including the step of adding to said multi-dimensional graphic data additional data representing a display interpretation aid and comprising one of:

graphic data titles, graphic axis names, graphic axis tic marks; and graphic axis tic numbers.

6. The method of claim 1 further including the step of adding to said accessed computer bit map data representation additional data representing tactile grid of horizontal and vertical lines.

7. The method of claim 4 further including the steps of:

adding to said computer memory data an additional array of computer memory data representing an additional data curve; and coding said additional data with one of a different second pin element vibration frequency and a different second pin element axial amplitude movement.

8. The method of claim 1 further including the step of energizing an audible sound generator in response to selected of said energizing accessed memory data-determined pixel elements steps.

9. The method of claim 8 wherein said audible sound generator comprises one of a tone-pitch generator, a tick sound generator and a spoken sound generator.

10. The method of claim 4 wherein said vibrating step comprises element vibration at differing frequencies of vibration in response to predetermined different data accessings from computer memory.

11. An unconstrained in time method of data display for combined sight and hearing-impaired user haptic realization of graphic data representations, said method comprising the steps of:

representing said graphic data as surface perturbations received on a computer memory data-defined virtual surface area, said surface perturbations corresponding with altered data states in said computer memory and being represented in absolute position registration over said virtual surface;

enabling prolonged, piecemeal, repeated and absolute position-sensed, multiple pinned display-array-communicated haptic exploration of said virtual surface and said data surface perturbations by said user, said prolonged, piecemeal, repeated and absolute position-sensed, multiple pinned display-array-communicated haptic exploration including multiple data point haptic array continuing readout accessing of portions of said computer memory in response to physical manipulation of a memory access control across an absolute position-registered virtual surface by said user person;

communicating results of said continuing readout accessing of said computer memory, including virtual surface data perturbation presence and absence-related memory data, to said user person as finger-received multiple data point small area haptic data samples of said memory contents at attained absolute positions on said virtual surface.

12. The method of claim 11 further including the steps of conveying a location of each said haptic data sample on said virtual surface, and a location of said haptic data sample data on a digitizer pad surface, to said user person through accomplishing said conveying step at a digitizer pad surface physical position also determined by said memory access control.

13. The method of claim 12 wherein:

said enabling step physical manipulation of a memory access control comprises positioning an absolute position sensing mouse pointer on said digitizer pad surface by said user person; and said conveying of a location of each said haptic data sample comprises positioning a combined absolute position sensing mouse pointer and a tactile feedback array matrix received in connection therewith at perturbation-related portions of said virtual surface area by said user person.

14. The method of claim 11 wherein said conveying step includes energizing data sample-determined individual pixel pins of an electrically energizable tactile feedback communicating array engaged by said user person.

15. The method of claim 11 wherein said continuing readout accessing of portions of said computer memory comprises reading a human finger size-related tactile array matrix determining portion of said memory.

16. The method of claim 15 wherein said continuing readout accessing of portions of said computer memory comprises reading a zoom-in and zoom-out control determined user selected image portion of said computer memory.

17. The method of claim 11 wherein said step of enabling prolonged, piecemeal and repeated haptic exploration of said virtual surface and said data surface perturbations by said user person, and said prolonged, piecemeal and repeated haptic exploration continuing readout accessing of portions of said computer memory in response to physical manipulation of a memory access control by said user person, further include the step of:

supplementing a less than complete data representation encounter of said data surface perturbations by said physical manipulation of a memory access control with a predetermined search-pattern-determined quantum of acquired additional contiguous data.

18. The method of claim 17 wherein:

said less than complete data representation encounter of said data surface perturbations comprises encountering a partial portion of a Braille character matrix by said memory access control; and said predetermined search-pattern-determined quantum of acquired additional contiguous data comprises a remainder portion of said Braille character matrix.

19. The method of claim 18 wherein said supplementing step and said predetermined search pattern acquiring include execution of a computer software routine.

20. The method of claim 11 wherein said continuing readout accessing of portions of said computer memory comprises two dimensional physical manipulation of said memory access control by said user person, two dimensional perception of Braille coded letters on said virtual surface, and user access to a full page Braille display of characters.

* * * * *